Feb. 6, 1962 R. O. WILSON 3,019,518
BLIND PULL RIVET ASSEMBLY MACHINE
Filed June 1, 1959 6 Sheets-Sheet 1

INVENTOR.
RAYMOND O. WILSON
BY C. G. Stratton
ATTORNEY

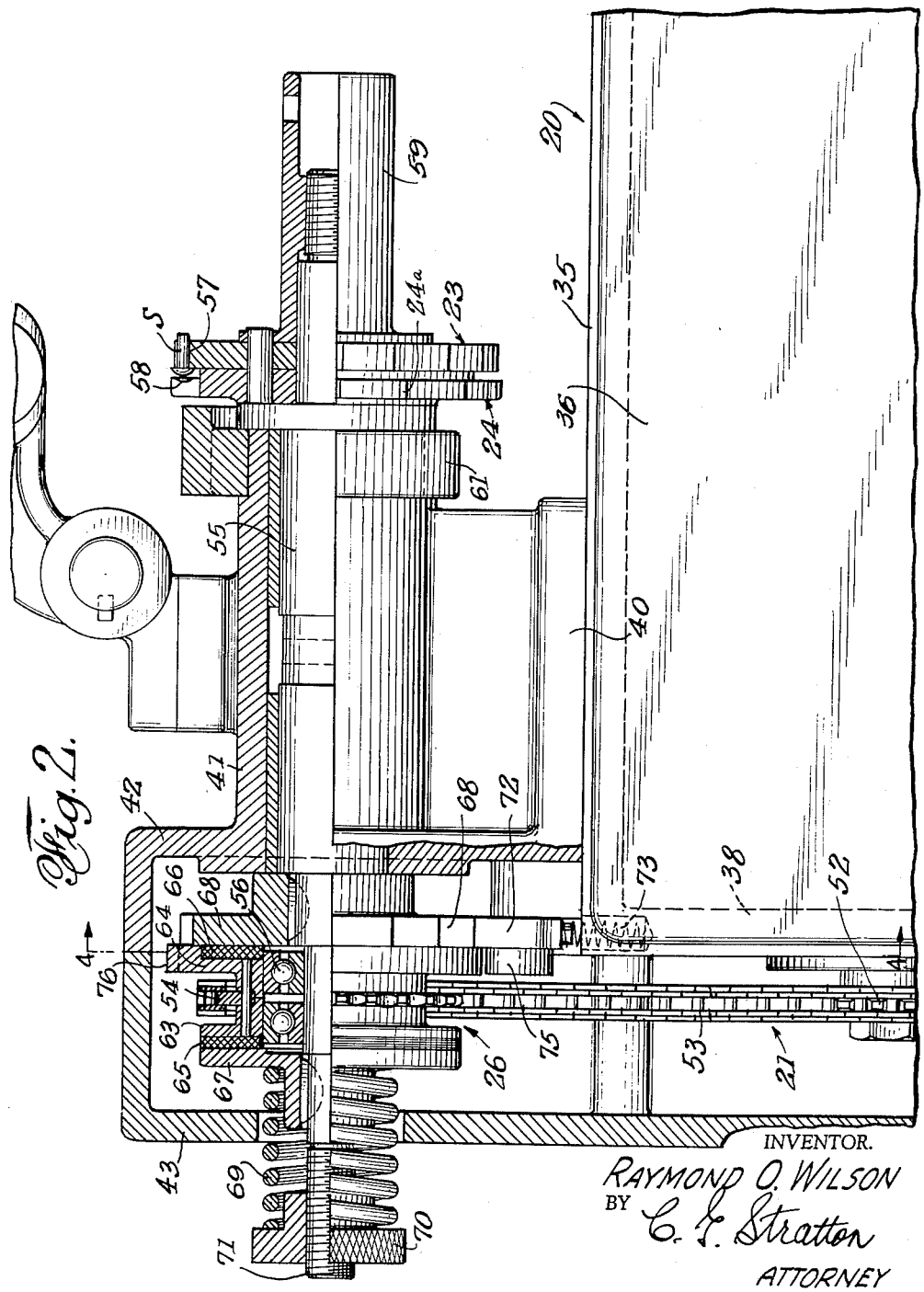

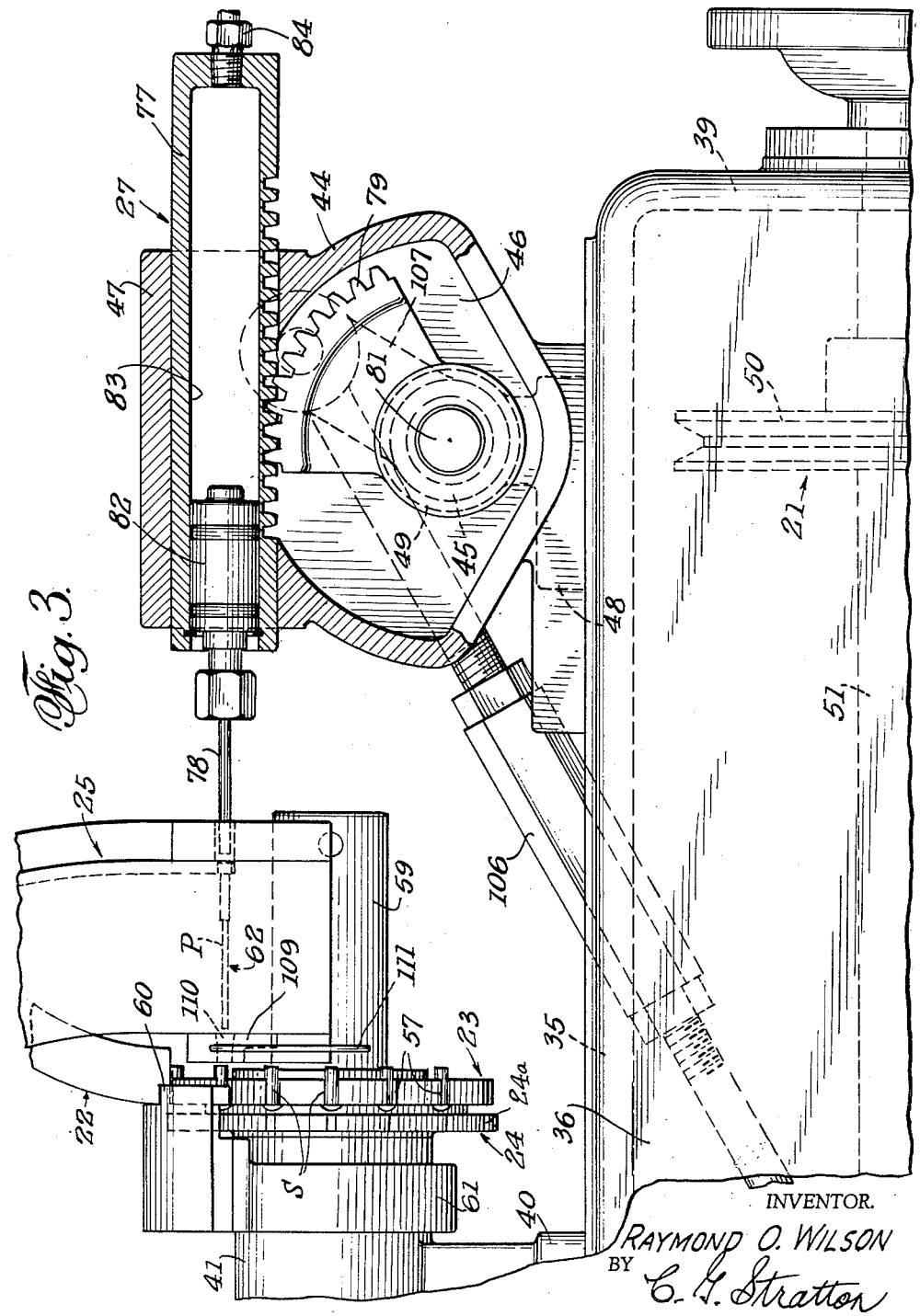

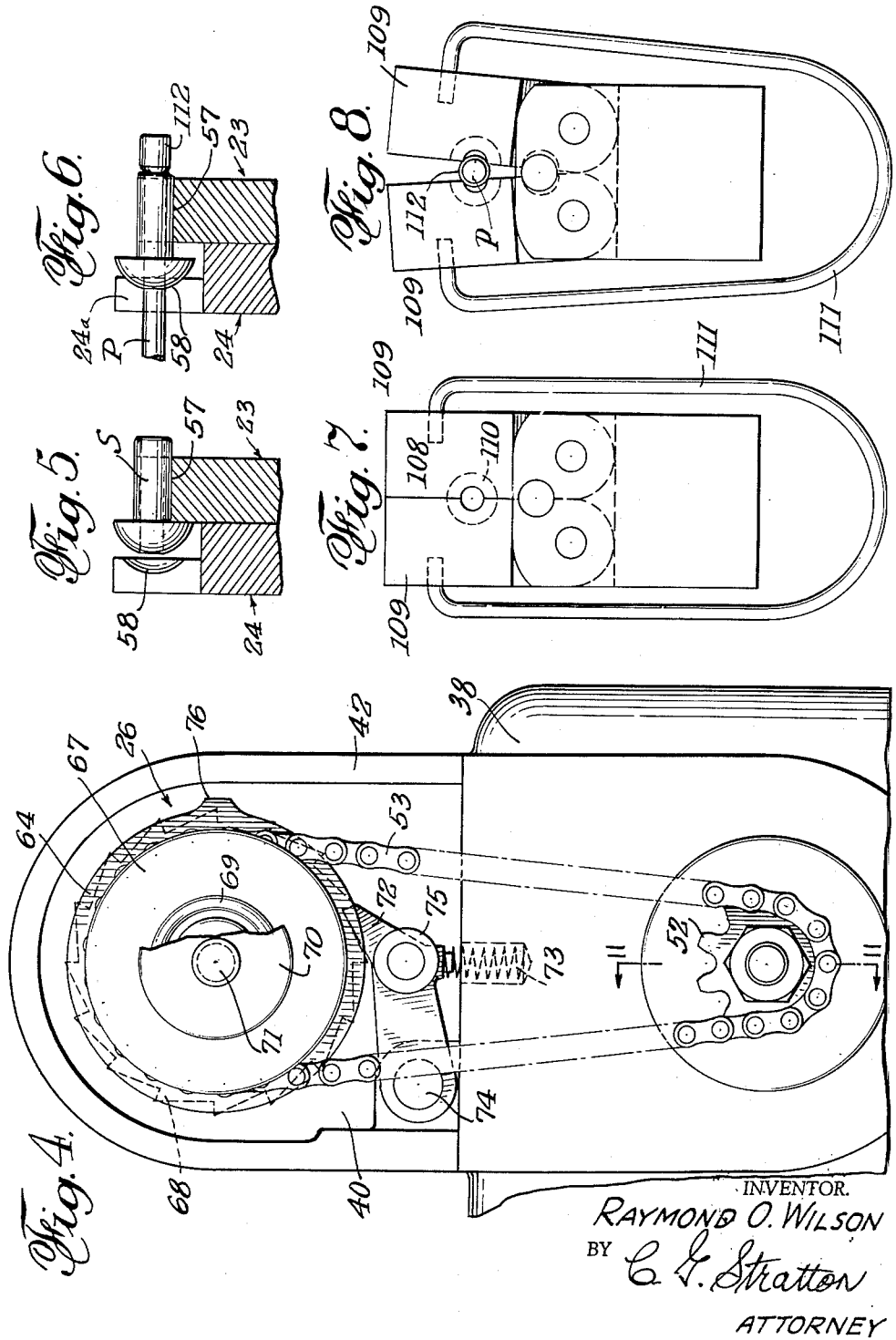

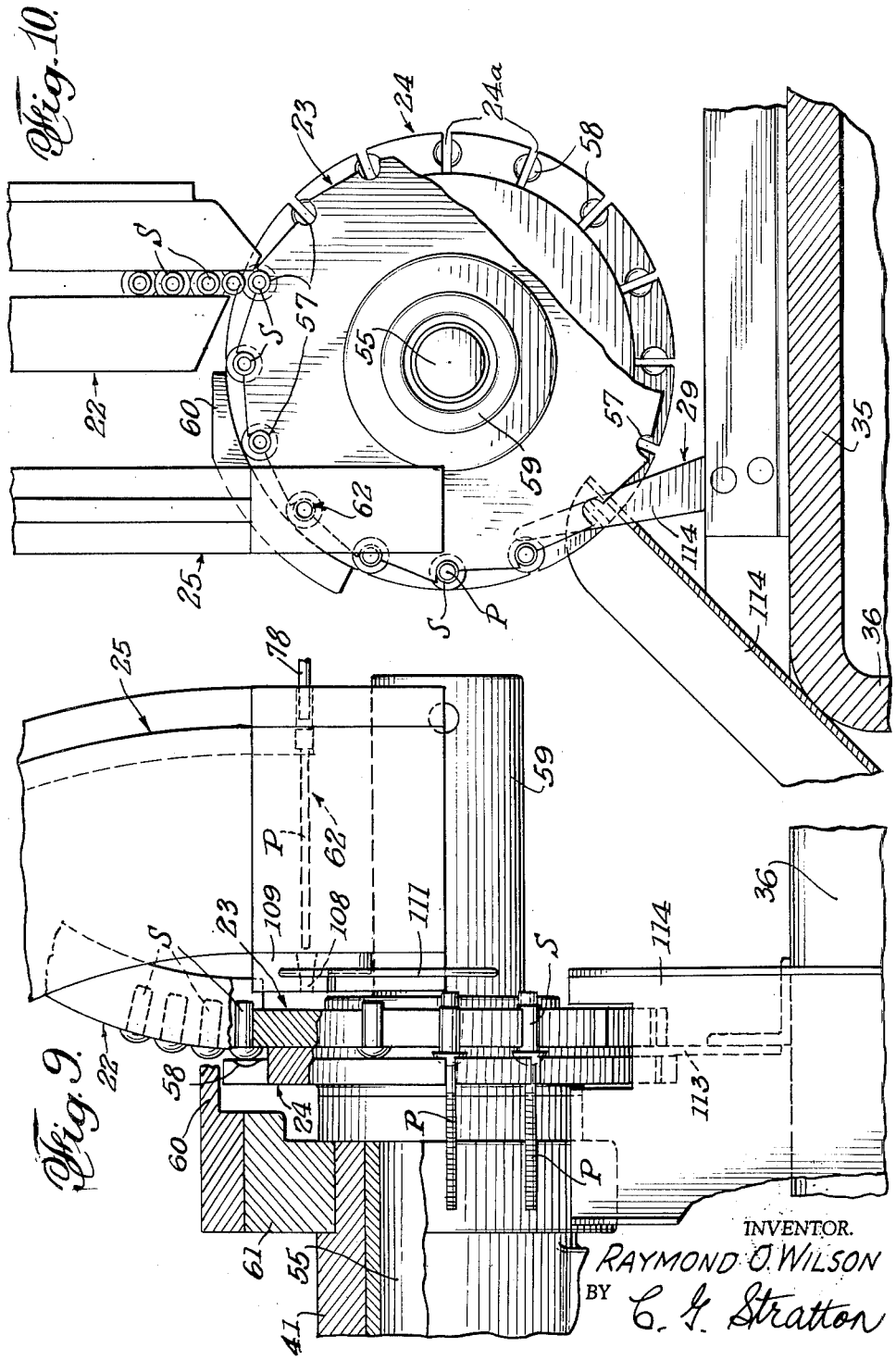

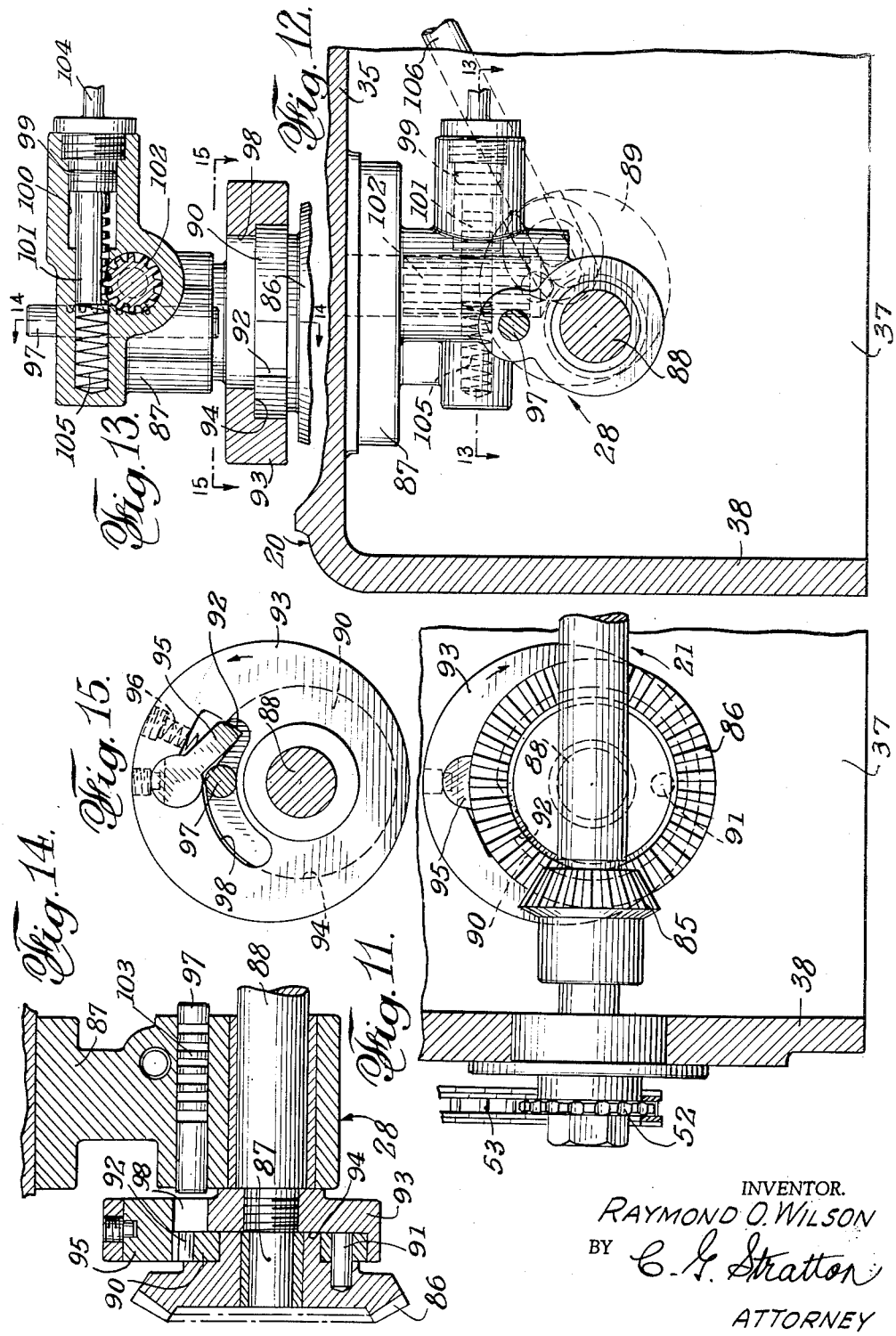

United States Patent Office 3,019,518
Patented Feb. 6, 1962

3,019,518
BLIND PULL RIVET ASSEMBLY MACHINE
Raymond O. Wilson, San Marino, Calif., assignor to Olympic Screw & Rivet Corporation, Downey, Calif., a corporation of California
Filed June 1, 1959, Ser. No. 817,163
11 Claims. (Cl. 29—211)

This invention relates to a machine for assembling blind pull rivets that are comprised of an outer, headed sleeve and an elongated pin that extends through said sleeve so that, upon a pull on the extending end of the pin, a head thereon spreads or clinches the sleeve to set the rivet.

An object of the present invention is to provide an assembly machine of the character indicated that embodies a simple feed of the sleeve and pin components, whereby the same are directly fed and assembled on the same carrier or index wheel, thereby providing not only a rapid operation but also a simplified construction.

Another object of the invention is to provide, in a machine for assembling the sleeve and pin of a clinch rivet, for simultaneous feed of a sleeve at one station and feed of a pin into the sleeve at a succeeding station, thereby gearing the speed of the operation to one of said feeds.

A further object of the invention is to provide an assembly machine, as indicated, that can be easily set up to assemble sleeves and pins of varying sizes.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

FIG. 2 is an enlarged longitudinal sectional view as taken on the line 2—2 of FIG. 1.

FIG. 3 is a similar sectional view as taken on the line 3—3 of FIG. 1.

FIG. 4 is a vertical elevational view as taken along the plane of line 4—4 of FIG. 2.

FIG. 5 is a further enlarged and fragmentary view showing a sleeve in position as fed to the machine.

FIG. 6 is a similar view showing a sleeve and pin in assembly in the machine.

FIG. 7 is a face view of a pin-guiding means used in the invention, the same being shown in normally closed position.

FIG. 8 is a similar view of the latter means open to pass a pin being moved into assembly with a sleeve.

FIG. 9 is an enlarged and fragmentary side elevational view of feed and index means used in the present invention.

FIG. 10 is a broken end view as seen from the right side of FIG. 9.

FIG. 11 is a fragmentary sectional view taken on the plane of line 11—11 of FIG. 4.

FIG. 12 is a fragmentary sectional view taken on a plane parallel and to the rear of the plane of FIG. 11.

FIG. 13 is a plan sectional view as taken on the line 13—13 of FIG. 12.

FIG. 14 is a vertical sectional view as taken on the line 14—14 of FIG. 13.

FIG. 15 is a vertical sectional view as taken on the line 15—15 of FIG. 13.

Figure 1:
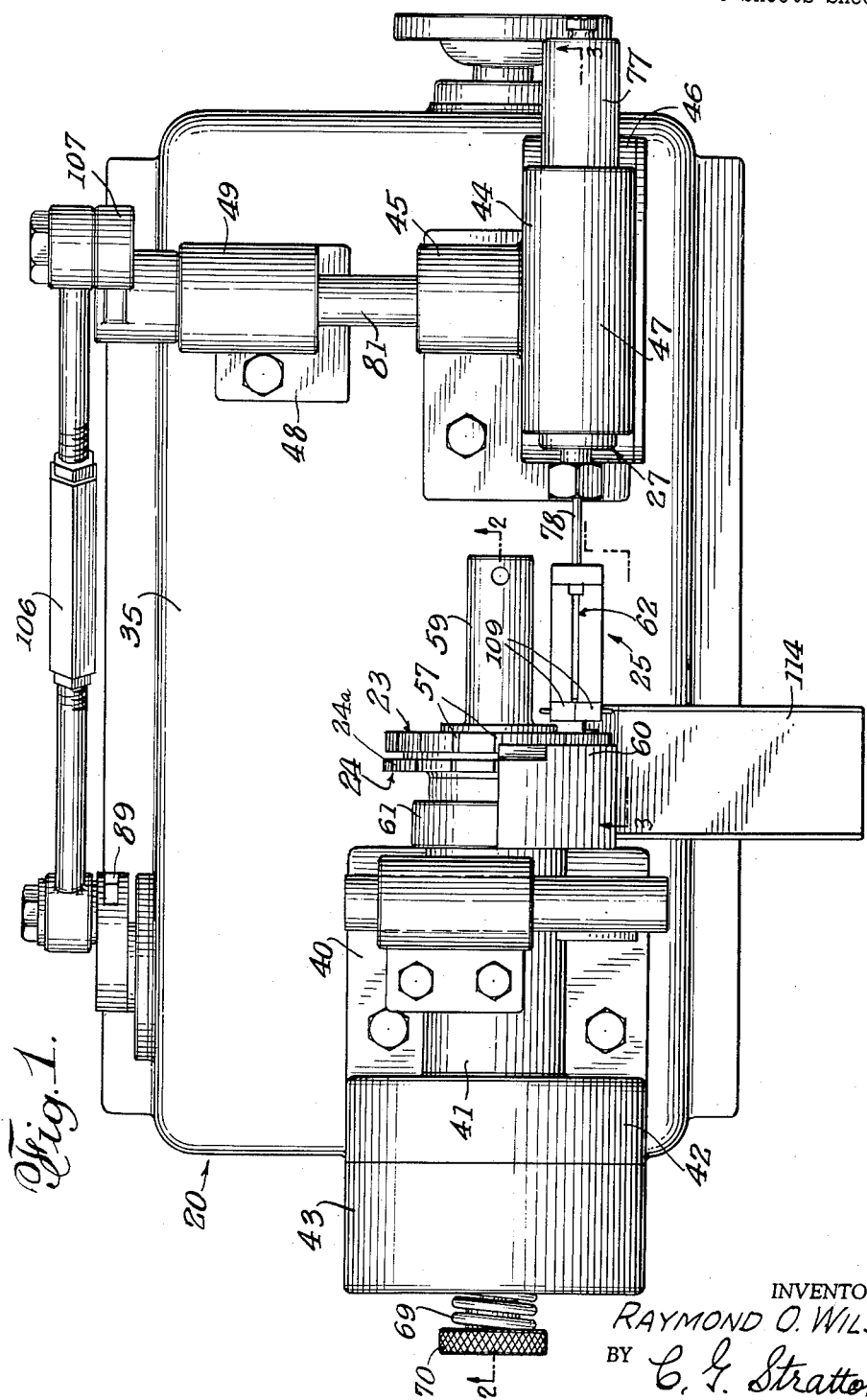
FIG. 1 is a plan view of a clinch rivet assembly machine embodying the features of the present invention.

The machine that is illustrated comprises, generally, a base 20, a continuous drive 21 mounted in the base, a chute 22 for supplying sleeves S in one-by-one sequence to the machine, an index disc 23 that receives sleeves from the chute 22, a backup disc 24 associated with the disc 23, a chute 25 for feeding pins in stacked sequential relation to the machine, an intermittent drive 26 intermittently rotating the discs 23 and 24 to intermittently move the sleeves S carried by the disc 24 from where the same are fed from chute 22, means 27 for displacing pins P from the chute 25 in a direction to enter sleeves aligned therewith as a result of the mentioned intermittent feed of the sleeves, means 28 driven by the continuous drive 21 for intermittently operating the pin-displacing means 27, and means 29 for dislodging an assembled rivet from the index disc 23.

The base 20 is shown as an interiorly hollow, rectangular housing having a horizontal top wall 35, front and rear walls 36 and 37, respectively, and opposite end walls 38 and 39.

The base 20 also comprises a bearing housing 40 that, as best seen in FIGS. 1, 2 and 3, is mounted and secured to the top wall 35 of the base housing. Said bearing housing is formed to have a bored bearing 41 that extends longitudinally of and above the wall 35. An enlarged housing part 42 on the housing 40 extends vertically above the end of the base housing that has the end wall 38. A cover 53 is provided for the open side of the bearing part 42 and for the wall 38 of the base housing that is therebeneath.

The base further includes a bracket 44 fastened to the base wall 35 at the end thereof nearer the end wall 39. Said bracket is provided with a transversely directed bearing 45, with a sector-shaped housing part 46, and with a longitudinal bearing 47 that is disposed on an axis forwardly offset from the axis of the bored bearing 41. The housing part 46 and bearing 47 define communicating areas accommodating the means 27. A bearing bracket 48 having a bearing 49 that is aligned with the bearing 45 is also provided on the wall 35 of the base 20.

The continuous drive 21 is shown as a pulley 50 that may be driven in the usual way, said pulley being mounted on a shaft 51 extending longitudinally within the base housing 20 and supported in bearings in walls 38 and 39 of said housing. Said shaft mounts a sprocket wheel 52 on an extension thereof outside of the wall 38. A chain 53 is trained over said sprocket wheel, the same extending upwardly within the cover 43 and is trained around a sprocket wheel 54 on the axis of a shaft 55 that is journaled in the bearing 41. The wheel 54 does not drive said shaft 55 but rather is mounted on antifriction bearings 56 to rotate independently of the shaft.

The chute 22 is quite conventional of feed means for receiving sleeves S from a hopper and directing the same to the machine. As can be seen from FIGS. 9 and 10, said sleeves are guided by the chute toward the index plate or disc 23 in such a manner that the heads of said sleeves are on the side toward the back-up disc 24. The sleeves reach disc 23 in a horizontal position.

The disc 23 is carried by and rotates with the shaft 55, the same having a vertical disposition at the end of bearing 41 that is opposite to where the sprocket wheel 54 is positioned. Disc 23 is provided with a plurality of uniformly spaced seats 57 that are provided in the periphery thereof. In this instance, sixteen seats are provided, the same being receptive of sleeves S as the same are fed by the chute 22.

The back-up disc 24 is also carried by shaft 55 and is disposed on the side of disc 23 where the heads of the sleeves S reside. Said disc 24 is spaced from the disc 23 and, in register with each seat of the latter disc, is provided with a recess 58 formed to receive the sleeve heads upon endwise shifting of the sleeves while in their seats 57. A tubular extension 59 is provided on said shaft 55 by means of which said shaft may be manually turned, as desired.

In connection with the wheel 23, a sleeve hold-down 60 is provided, the same overstanding the seats 57 after they receive sleeves from the chute 22. Said hold-down is shown as carried on a hub 51 mounted on the bearing 41.

The seats 57 receive sleeves S at a station on disc 25 that is forward of the hold-down, as in FIG. 10. Then, as the disc 23 is moved counter-clockwise, the hold-down prevents outward displacement of the sleeves until after the same are provided with pins P.

The pin-feeding chute 25 is also quite conventional, the same feeding pins P to a position, at 62, where they are aligned with a station of disc 23 that is advanced three stations beyond the sleeve-feeding station. FIG. 10 shows this condition and it will be realized that any suitable advance station may be used for the pin-introducing station.

The intermittent drive 26 is best shown in FIGS. 2 and 4. Said drive comprises oppositely directed flanges 63 and 64 that are secured to and rotate with the sprocket wheel 54, non-metallic friction discs 65 and 66, respectively engaged with the flanges 63 and 64, a disc flange 67 that cooperates wtih flange 63 to frictionally engage the disc 65 between them, and a ratchet wheel 68, having sixteen teeth, the same number as the number of seats 57 in disc 23, the latter wheel serving also as a disc flange that cooperates with the flange 64 to frictionally engage the disc 65 between them. Both the flange 67 and the ratchet wheel are keyed to the shaft 55 and turn therewith.

Friction of a degree that enables the sprocket wheel to rotate shaft 55 is imposed on the above-described friction clutch assembly by a spring 69 that is compressed against the flange 67 by a friction nut 70 on the threaded end 71 of the shaft 55.

However, the ratchet wheel 68 is normally held against rotation by a pawl 72 that is engaged with one of the ratchet teeth under bias of a spring 73. Said pawl is carried by the bearing housing 40 on a pivot 74 and the same is provided with a roller 75 that is in the path of rotation of the lobe 76 of a cam extension of the flange 64. Since the ratchet wheel is keyed to shaft 55, said shaft cannot rotate while the pawl is engaged with a ratchet tooth. Therefore, the drive 21 can only cause rotation of flanges 63 and 64, there being slippage between said flanges and the friction discs 65 and 66. Rotation of shaft 55 is had only when the cam lobe 76 encounters the roller 75 to cause retraction of the pawl. Since, as can be seen from FIG. 4, said lobe is of small circumferential extent, when the same releases the roller 75, the pawl 72 instantly engages the oncoming tooth of the ratchet wheel 68 to stop rotation of the shaft. Thus, shaft 55 has a one-sixteenth rotational increment each time the cam lobe 76 causes retraction of the pawl 72. Therefore, the continuous operation of the drive 21 produces an intermittent advance of the discs 23 and 24, the advance being in a counter-clockwise direction, as seen in FIG. 10.

The pin-displacing means 27 is shown in FIGS. 1 and 3, the same comprising a plunger 77 longitudinally slidable in the bearing 47, an ejection or push rod 78 extending from said plunger to and in alignment with a pin P at the mentioned position 62 of the chute 25, and plunger projecting and retracting means here shown as a segmental gear 79 and rack teeth on the plunger 77 and in mesh with said gear. The bearing 45 houses a shaft 81 that extends transversely of the machine through the bearing 49 of bracket 48. The segmental gear 79 is affixed to said shaft 81 and resides in the housing part 46 of bracket 44. It will be clear that oscillation of shaft 81 causes oscillation of gear 79 and reciprocation of plunger 77 and of the push rod 78.

Since it is simpler to provide for a uniform increment of reciprocation of the plunger 77 than to provide for variations in such movement and also to insure a non-breakage feed of pins by the rod 78, the latter is carried by a piston 82 in a cylinder 83 formed in plunger 77, said piston being backed by compressed air introduced in the cylinder, as through an end fitting 84 on the plunger. Thus, as the plunger 77 moves, the rod 78 first moves therewith and, when arrested as the pin P is stopped after complete introduction into an aligned sleeve S, there is a momentary retraction of the piston 82 into the cylinder 83 against the air cushion in said cylinder. This air cushion prevents breakage of parts and accommodates for any variations in the length of the pins P. The same is useful also when pin lengths are changed. It will be evident that insertion of the pin into the sleeve causes a shifting of said sleeve to bring its head into the recess 58 of the back-up disc. Then the pin passes through the slot 24a, as can be seen in FIG. 6.

The means 28 that intermittently operates the means 27 is best shown in FIGS. 11 to 15, said means being driven from the continuously rotating shaft 51 and synchronized to cause projection of the rod 78 when the disc 23 is stationary.

The means 28 comprises a bevel gear 85 on the continuously driven shaft 51, a bevel gear 86 driven by the gear 85 and mounted to freely rotate on the end 87 of a transverse shaft 88. The latter carries a crank 89 and is journalled in the wall 37 of the base 20. A clutch driver disc 90 is connected to the gear 86, as by a pin 91 and thereby rotates with said gear. Said disc is provided with a peripheral notch that defines a drive shoulder 92.

A clutch housing 93 has a seat 94 into which disc 90 is fitted, and a clutch dog 95, carried by said housing, is biased by a spring 96 into driving engagement with said shoulder. Thus, so long as the dog 95 remains in engagement with the shoulder 92, rotation of the gear 86 will be imparted to housing 93 and, through shaft 88 to the crank 89. Upon retraction of said dog 95, such drive of the crank will stop until the dog is allowed to re-engage the shoulder 92.

To this end the bracket 87 carries a pin 97 above and parallel to the shaft 88, the same having an end that is directed toward a segmental slot 98 in the clutch housing 93, said slot affording a passage through which said pin 97 may extend into retractive engagement with the dog 95. As shown in FIG. 15, said pin engages dog 95 as to raise the same out of engagement with shoulder 92, allowing rotation of the driver disc 90 to continue while the housing 93 comes to rest. Upon retraction of pin 97 to the position of FIGS. 13 and 14, after a full turn of the driver disc, the dog will fall into the notch that has the shoulder 92 and re-establish the drive to crank 89.

The pin 97 is projected by means of an air-projected piston 99 in a cylinder 100 formed in the bracket 87, a gear rack 101 projected by said piston and in mesh with a pinion 102 which, therefore, is rotated by projection of rack 101, and rack teeth 103 on pin 97 and engaged with said pinion. Air is introduced into cylinder 100 through a fitting 104 to cause such projection of pin 97, and a spring 105 against which the rack 101 is projected returns said pin to retracted position. It will be clear that inlet of compressed air at fitting 104 may be timed to cause projection of the pin 97 and release of the above-described clutch to bring the crank 89 to rest in synchrony with the rest period of the index disc 23.

The described means 28 causes oscillation of the shaft 81 above described. A pitman 106 connects the crank 89 to an arm 107 on the shaft 81, and it will be clear that each full turn of said crank causes the back and forth reciprocation of the segment previously described.

Since, upon institution of the retraction movement of the push rod 78, the disc 23 is free to be indexed by the drive 26, the oscillating movement of segmental gear 79 may be produced by a uniform rotation of crank 89, thus obviating the need for the means 28. In other words, the rod 78 may be in continuous reciprocative movement, providing the same retracts fully to allow a pin P to reach the station 62 before being projected to feed said pin to a sleeve in register therewith.

In order to insure straight-line feed of pins P into sleeves S, the former may be guided through a passage 108 provided at the seam of a pair of hinged members 109 that are disposed between the pin-feeding chute 25 and the index disc 23. Said passage may have a flared lead-in 110. A spring 111 biases the members 109 to a normally closed position, said spring yielding during separation of the members, as in FIG. 8, when the clinching head 112 of a pin enters passage 108 and spreads the members 109 accordingly. When the rod 78 pushes a pin wholly through said passage 108 and into a sleeve, as shown in FIG. 6, the members 109 return to closed condition, as in FIG. 7.

At any time after assembly of a pin P in a sleeve S to produce a clinch rivet, the assembled unit may be removed from disc 23, the means 29 being exemplary for this purpose. Said means is shown as a member 113 that is disposed between discs 23 and 24 or may comprise any other means suitable for this purpose. A chute 114 may catch the assembled rivets and guide the same to a container.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described the invention, what is claimed and desired to be secured by Letters Patent is:

1. In a machine for assembling pins into sleeves having heads at one end, an intermittently moving index disc having a plurality of uniformly spaced seats in the periphery thereof, a back-up disc fixedly connected to the index disc and having its peripheral portion spaced from the index disc and from the seat therein, a chute to gravitationally feed sleeves in a direction toward the edge of said disc, one at a time, with the heads on the sleeves freely entering and being disposed in the space between the discs, said space being greater than the thickness of the sleeve heads and the sleeves, thereby, being movable endwise in their seats until said heads encounter the back-up disc, a pin-feeding chute, means to displace pins from the end of the latter chute and introduce them into said sleeves from the ends thereof that are opposite to the sleeve heads, said pins and sleeves engaging to slide the sleeve to bring the heads thereof against the back-up plate during such introduction of pins into the sleeves, and means to operate the pin-displacing means when the index disc is at rest.

2. In a machine according to claim 1, said back-up disc being provided with recesses that receive the sleeve heads when the sleeves are slid, there being slots in the back-up disc to allow the pins to pass therethrough.

3. In a machine according to claim 1, the pin-introducing means comprising a hollow plunger, means to drive said plunger toward the discs when the latter are at rest, a push rod slidably mounted in the plunger, and means to supply air pressure to the plunger to create an air cushion therein that resiliently urges the push rod in a direction to engage the end of a pin and push the same from the feed chute into an aligned sleeve on the index disc.

4. In a machine according to claim 1, the mentioned plunger and push rod being disposed to move in a path parallel to and offset from the axis of rotation of the index and back-up discs.

5. In a machine according to claim 1, means independent of the pin-introducing means and in the path of feed of the pins to center said pins on the sleeves into which introduced.

6. In a machine according to claim 5, said pin-centering means comprising a pair of pivoted edge-abutted members in said path of feed of the pins, said members having a passage for the pins that is partly in each said edge, and spring means to bias the members in a direction to engage around and align the pins with the sleeves into which they are to be introduced.

7. In a machine for assembling pins into sleeves having heads at one end, an intermittently moving index disc having a plurality of uniformly spaced seats in the periphery thereof, a back-up disc fixedly connected to the index disc and having its peripheral portion spaced from the index disc and from the seat therein, a chute to gravitationally feed sleeves in a direction toward the edge of said disc, one at a time, with the heads on the sleeves freely entering and being disposed in the space between the discs, said space being greater than the thickness of the sleeve heads and the sleeves, thereby, being movable endwise in their seats until said heads encounter the back-up disc, said discs being disposed on a horizontal axis and the feed of sleeves into the seats of the index disc being downward, a pin-feeding chute, means to intermittently rotate the discs, and means operative, when the discs are at rest, to displace pins from the pin chute and introduce them into said sleeves from ends of the latter that are opposite from the heads thereof.

8. In a machine according to claim 7, the pin-introducing means being disposed to operate along a line parallel to and offset from the axis on which the discs rotate.

9. In a machine according to claim 8, the pin-introducing means including a push rod, a pair of pivoted members in the feed path of the pins, said members having a passage for the pins, and spring means biasing the members to engage pins passing through said passage to align the pins with the sleeve into which introduced.

10. In a machine according to claim 8, the pin-introducing means including a push rod, a pair of pivoted members in the feed path of the pins, said members having a passage for the pins, spring means biasing the members to engage pins passing through said passage to align the pins with the sleeve into which introduced, said discs being disposed on a horizontal axis and the feed of sleeves to the seats thereof being from above, means to intermittently rotate the discs, and means operative, when the discs are at rest, to introduce pins into said sleeves from the ends of the latter that are opposite to the heads.

11. In a machine for assembling pins in sleeves having heads, an intermittently moving index disc having a plurality of uniformly spaced seats open to the periphery of the disc, said index disc being mounted on a horizontal axis with the plane of the disc vertical, a parallel backing plate spaced from the disc and affixed thereto to move on the same axis, said plate, in the face thereof directed toward the disc, having shallow seats in register with the seats in the index disc and having radial slots extending from said shallow seats to the periphery of the backing plate, means to gravitationally drop sleeves from above into the index disc seats, one at a time, said sleeves having heads entering the space between the disc and the plate as the sleeves seat in the disc and, thereby, are aligned with the seats in the backing plate, a pin-feeding chute, means, operative during the periods of rest of the index disc, to displace pins from the end of the latter chute and introduce them, along a line parallel to said axis, into the sleeves, one at a time, said pins being of a diametral size to encounter the ends of the sleeves during the first part of the feed thereof to push the same in a direction to impinge the heads thereof onto the seats in the backing plate and then to enter the bores of said sleeves during the final part of the pin feed and to pass through the slots in the backing plate during the latter movement, said assembled sleeves and pins being readily displaceable from their position on the disc when the latter has progressed so as to bring assembled articles to a point below the mentioned axis.

References Cited in the file of this patent

UNITED STATES PATENTS

| | | |
|---|---|---|
| 2,324,925 | Hallowell | July 20, 1943 |
| 2,681,668 | Lubbert | June 22, 1954 |
| 2,729,833 | Nielsen | Jan. 10, 1956 |
| 2,792,578 | Autio | May 21, 1957 |
| 2,824,361 | Brown | Feb. 25, 1958 |
| 2,841,937 | Miskel | July 8, 1958 |